United States Patent

Redman

[11] Patent Number: 5,956,847
[45] Date of Patent: Sep. 28, 1999

[54] METHOD FOR MANUFACTURING A FLUID COUPLING APPARATUS

[76] Inventor: Robert J. Redman, 8230 M-68, Indian River, Mich. 49749

[21] Appl. No.: 09/103,214

[22] Filed: Jun. 23, 1998

[51] Int. Cl.[6] .................................................. H01B 19/00
[52] U.S. Cl. ................................... 29/890.14; 29/890.03; 29/890.043; 29/432.2; 29/512; 72/370.04; 72/370.26
[58] Field of Search ..................... 29/890.14, 890.14 A, 29/890.043, 890.03, 512, 432.2, 513; 72/75, 335, 370.26, 370.04, 379.2, 379.4

[56] References Cited

U.S. PATENT DOCUMENTS

| | | |
|---|---|---|
| 12,688 | 8/1855 | Oakes . |
| 1,980,080 | 11/1934 | Niles . |
| 2,003,488 | 6/1935 | Hook ................................... 29/890.14 |
| 2,445,548 | 7/1948 | Wiepert ................................ 72/379.4 |
| 2,859,870 | 11/1958 | Hitz ..................................... 29/890.14 |
| 3,221,533 | 12/1965 | Buys ..................................... 72/379.2 |
| 3,263,244 | 8/1966 | Katz . |
| 3,388,705 | 6/1968 | Grosshandler . |
| 4,159,027 | 6/1979 | Caillet . |
| 4,173,361 | 11/1979 | Gagas . |
| 4,246,772 | 1/1981 | Moshnin et al. ..................... 29/890.14 |
| 4,459,318 | 7/1984 | Hyans . |
| 4,604,786 | 8/1986 | Howie, Jr. .................................. 29/513 |
| 4,615,098 | 10/1986 | Come et al. .......................... 29/890.14 |
| 4,656,721 | 4/1987 | Werner ................................... 29/512 |
| 4,972,571 | 11/1990 | Cole et al. .................................. 29/512 |
| 5,067,235 | 11/1991 | Kato et al. ................................ 29/512 |
| 5,257,825 | 11/1993 | Wilcock ............................... 29/890.14 |
| 5,644,829 | 7/1997 | Mason et al. .......................... 29/421.1 |
| 5,673,580 | 10/1997 | Ohno .......................................... 72/75 |
| 5,855,137 | 1/1999 | Weber et al. ......................... 72/370.26 |

*Primary Examiner*—Irene Cuda
*Assistant Examiner*—Trinh T. Nguyen
*Attorney, Agent, or Firm*—Young & Basile, P.C.

[57] ABSTRACT

A method for manufacturing a fluid coupling apparatus for communicating fluid between a fluid hose and a heat exchanger. The present invention provides an inexpensive method for producing an integral fluid coupling apparatus that minimizes and eliminates the spacing and clearance required of bending tubular fluid lines and conduits. The method of the present invention utilizes a seamless welded tubing and compresses a portion of the tubing into a hollow rectangular configuration. During the pressing operation, a sphere is inserted into the tubing and aligned with an aperture previously formed in a wall of the tubing. When the tubing is compressed, the sphere is forced through the aperture provided in the tubing, and a raised lip or shoulder is extruded from the portion of the tubing defined in the aperture. A raised lip or shoulder is formed from the extrusion, and the raised lip is inserted through an aperture provided in a wall of the heat exchanger and rolled onto the wall of the heat exchanger. The end of the tubing opposite the compressed rectangular configuration maintains its cylindrical configuration for receiving the fluid hose.

13 Claims, 3 Drawing Sheets

METHOD FOR MANUFACTURING A FLUID
COUPLING APPARATUS

The present invention relates to a method for manufacturing a fluid coupling apparatus that communicates fluid from a fluid hose to a heat exchanger, and in particular, an inexpensive and efficient method of producing an integral fluid coupling apparatus which minimizes or eliminates the spacing required and associated with bent fluid coupling lines.

BACKGROUND OF THE INVENTION

In general, engine compartments of cars, motorcycles and similar machines are lubricated and cooled by using engine or motor oil. Typically, the engine or motor oil is cooled by circulating the engine oil through an oil cooler or heat exchanger. The heat exchanger is in communication with an engine block and oil filter and provides a circulating passageway for the engine oil. The heat exchanger is also in communication with the engine's coolant wherein the engine coolant circulates throughout the heat exchanger to cool the engine oil.

Due to the limited spacing which is typically provided in engine compartments, especially the area surrounding the engine block, fluid hose lines directing the engine coolant to and from the heat exchanger must be connected to the heat exchanger in a manner that limits the amount of spacing required between the heat exchanger and the fluid hose lines. This can be difficult to accomplish when the engine coolant lines extend parallel to a substantially flat surface of the heat exchanger in which the heat exchanger is accessed. This requires that the fluid lines bend at a substantially right angle to communicate with the access provided in the flat surface of the heat exchanger. When bending the fluid hose lines, a certain amount of space or clearance must be provided so that the fluid hose does not kink or fold thus prohibiting or restricting fluid from passing through the fluid hose and communicating with the heat exchanger.

To minimize the clearance and spacing required of bending fluid hose lines, known designs have welded or brazed a rectangular steel block onto the end of a seamless welded tubing. A 90° bore is machined through the steel block so as to provide a passageway extending from the steel tube and steel block and into an inlet or access provided in a wall of the heat exchanger. The steel block is brazed to the wall of the heat exchanger to prohibit any leaking or dislodging of the steel block from the heat exchanger. This known design eliminates the clearance required for bending fluid coupling lines, but the design is laborious and expensive to manufacture, which is undesirable in a production environment.

SUMMARY OF THE INVENTION

The present invention solves the above-mentioned shortcomings by providing a method for manufacturing a fluid coupling apparatus that communicates fluid from a fluid hose to a heat exchanger wherein the fluid coupling apparatus minimizes or eliminates the spacing required of bent fluid lines. The method of the present invention includes providing a substantially cylindrical hollow tube having a first portion and a second portion. An aperture is formed through a wall of the second portion of the tube, and a solid sphere is placed inside the second portion of the tube in axial alignment with the aperture. The sphere has a diameter smaller than the second portion of the tube and larger than the aperture provided in the wall of the second portion. The second portion of the tube is compressed to form a hollow substantially rectangular configuration. During the compression of the second portion, the sphere is forced through the aperture of the second portion, and a shoulder or lip is extruded outward from the wall of the second portion. The open end of the second portion of the tube may be slotted and folded over to create a substantially rectangular and partially closed end in the second portion. A cap or cover is brazed onto the partially closed end of the second portion to seal and close the end of the second portion.

In compressing the second portion of the tube, the tube is placed in a stamping press dye having a configuration corresponding to the final configuration of the fluid coupling apparatus. A first portion of the dye has a cylindrical configuration, and the second portion of the dye has a substantially rectangular configuration. A ram or press is actuated to compress the second portion of the tube against the second portion of the press dye. An aperture extending through the second portion of the dye is provided for receiving the sphere when forced through the aperture in the second portion of the tube by the actuation of the press.

To connect the fluid coupling apparatus to the heat exchanger and the fluid hose, the first portion of the fluid coupling apparatus provides a first and second bead for accommodating the fluid hose. The first bead provides an annular shoulder extending radially outward from the first portion of the tube. The tube tapers radially inward from the first bead toward the open end of the first portion of the tube. The configuration of the first bead and taper accommodates the sliding of the fluid hose on to the fluid coupling apparatus and retains the fluid hose onto the fluid coupling apparatus. A second bead having a radially extending shoulder is also provided on the first portion of the tube. The second bead is spaced axially toward the second portion of the tube from the first bead and provides a positive stop for preventing the fluid hose from sliding beyond the second bead.

To connect the fluid coupling apparatus to the heat exchanger, the raised shoulder or lip that is extruded from the aperture of the second portion of the fluid coupling apparatus is inserted into an aperture provided in the heat exchanger. The raised shoulder or lip is rolled onto the interior portion of the heat exchanger which defines the aperture. The rolled portion of the raised shoulder or lip is brazed onto the wall of the heat exchanger to provide a sealed and secure fit of the fluid coupling apparatus to the heat exchanger.

To this end, the objects of the present invention are to provided a new and improved method for manufacturing a fluid coupling apparatus that communicates fluid from a fluid hose to a heat exchanger.

In addition, the objects of the present invention are to provide an inexpensive and efficient method of producing a fluid coupling apparatus that communicates fluid from a fluid hose to a heat exchanger wherein the fluid coupling apparatus does not require the spacing associated with the bending of fluid coupling lines.

BRIEF DESCRIPTION OF THE DRAWINGS

The various and other uses of the present invention will become more apparent by referring to the following detailed descriptions and drawings in which.

DESCRIPTION OF THE PREFERRED EMBODIMENT

Figure 8:
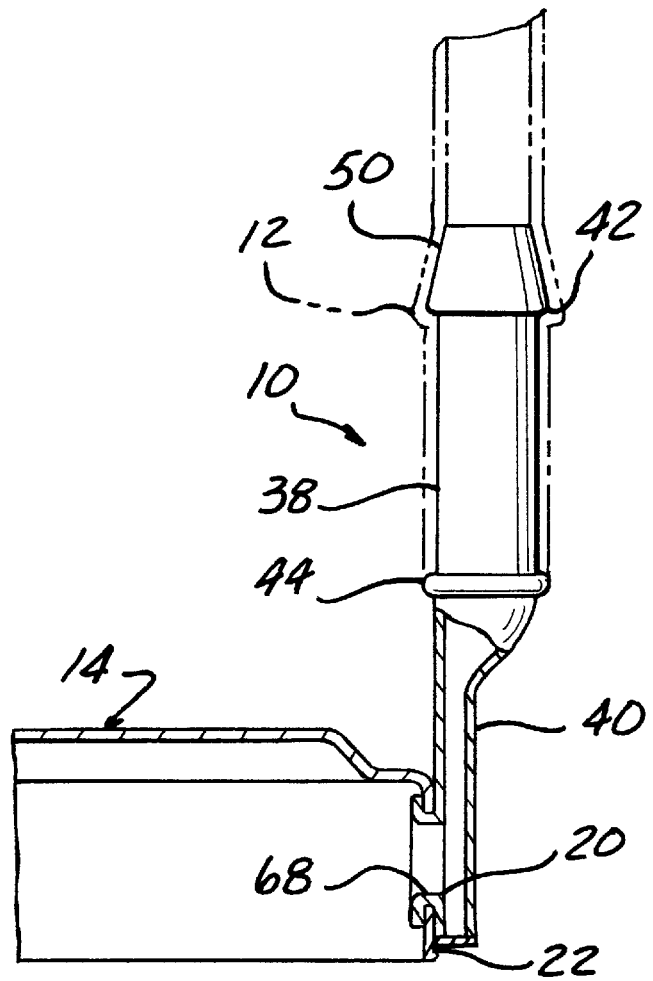
FIG. 8 is a partially sectioned side view of the present invention connected to a heat exchanger and a fluid hose.

FIGS. 2 through 7 depict a method for manufacturing a fluid coupling apparatus 10 as defined by the present invention. Although the present invention may be utilized to produce a fluid coupling apparatus 10 in conjunction with a variety of fluid containment and circulation systems, the present invention is best suited for manufacturing a fluid coupling apparatus 10 that communicates fluid between a flexible fluid hose 12 and an engine oil heat exchanger 14, as seen in FIG. 8. Thus, the remainder of the detailed description will refer to and reference the present invention for manufacturing a fluid coupling apparatus 10 that is utilized in conjunction with heat exchangers and fluid hoses, although it is to be understood that the present invention may be utilized to produce fluid coupling apparatuses that are utilized in conjunction with a variety of fluid hoses and circulation devices.

Figure 1:
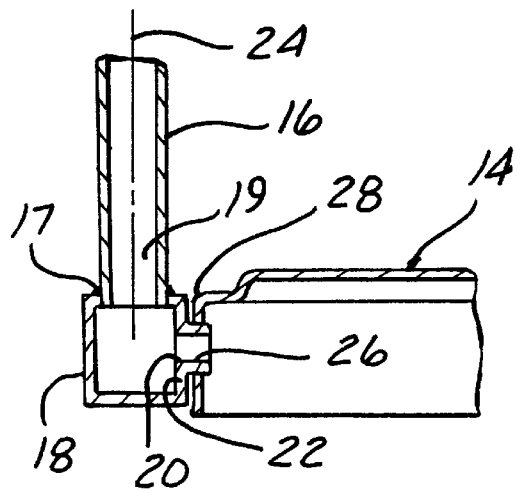
FIG. 1 is a sectional view showing the prior art fluid coupling apparatus attached to a heat exchanger.

The method defined as the present invention is best suited for manufacturing a relatively inexpensive and integral fluid coupling apparatus 10 that minimizes or eliminates the clearance or spacing required of bending fluid hoses, fluid couplings, tubes and conduits. FIG. 1 shows a prior art design wherein a steel tube 16 is brazed or welded 17 to a steel hollow block 18. The steel tube 16 provides a passageway 19 in communication with the interior of the steel hollow block 18. An aperture 20 is provided in a side wall 22 of the block 18 that is substantially perpendicular to the longitudinal axis 24 of the steel tube 16. A lip or shoulder 26 protrudes from the portion of the block 18 which defines the aperture 20 in the side wall 22 of the block 18. The lip 26 extends through an aperture provided in a wall 28 of the heat exchanger 14 and is brazed to the interior surface of the wall 28 of the heat exchanger 14 so as to provide a secure connection between the block 18 and the heat exchanger 14. The prior art design allows for minimal spacing between the steel tube 16 and the heat exchanger 30, but the prior art design is expensive and laborious to manufacture.

Figure 2:
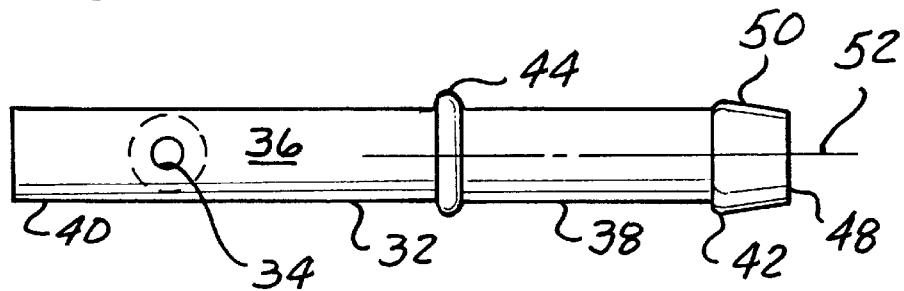
FIG. 2 is a side view of the substantially cylindrical hollow tube prior to being compressed.

To produce an inexpensive and integral fluid coupling apparatus 10 that minimizes the clearance and spacing required of a bent tube or fluid coupling, the method of the present invention begins by providing a piece of metallic tubing 32, as shown in FIG. 2. Preferably, the metallic tubing 32 is fabricated from a seamless welded 1020 cold rolled steel. An aperture 34 is formed through a single wall 36 of the tubing 32 by punching, drilling or utilizing any conventional method which will create the aperture 34 in the tubing 32. The tubing 32 may be defined as having a first portion 38 and a second portion 40 wherein the aperture 34 is formed in the second portion 40 of the tubing 32.

A first bead 42 and a second bead 44 are formed on the first portion 38 of the tubing 12 to secure and maintain the position of the flexible fluid hose 12 on the fluid coupling apparatus 10. The first and second beads 42, 44, respectively, are formed through a conventional stamping or press operation. The tubing 32 is placed over a corresponding dye (not shown) and the tubing 32 is struck to form the corresponding shape associated with the dye. Several strikes of the tubing 32 may be required to reach the desired configuration, or a number of progressively shaped dyes may be required to progressively obtain the desired configuration.

The first bead 42 is formed on an open end 48 of the first portion 38 of the tubing 32. The first bead 42 provides a raised annular shoulder which extends outwardly from the circumference of the tubing 32. The tubing 32 tapers radially inward from the first bead 42 toward the open end 48 of the first portion 38 of the tubing 32 to form a taper 50 that has a slightly smaller diameter than the diameter of the tubing 32. The taper 50 accommodates the reception of the flexible fluid hose 12, and the first bead 42 helps maintain the position of the flexible hose 12 on the first portion 38 of the tubing 32.

The second bead 40 is also formed on the first portion 38 of the tubing 32 and is axially spaced along the longitudinal axis 52 of the tubing 32 from the first bead 42. The second bead 18 provides a raised annular shoulder which extends radially outward from the first portion 38 of the tubing 32. The second bead 44 prevents the fluid hose 46 from extending too far along the first portion 38 of the tubing 32 by acting as a positive stop to the fluid hose 12.

Preferably, the first and second beads 42, 44, are formed prior to the remaining methods of the present invention. The preference is based on the fact that the tubing 32 is easier to handle for purposes of forming the first and second beads, 42, 44 when the tubing 32 is in its straight cylindrical configuration. In the alternative, the first and second beads 42, 44 may be fabricated at the end of the inventive process.

Figure 3:
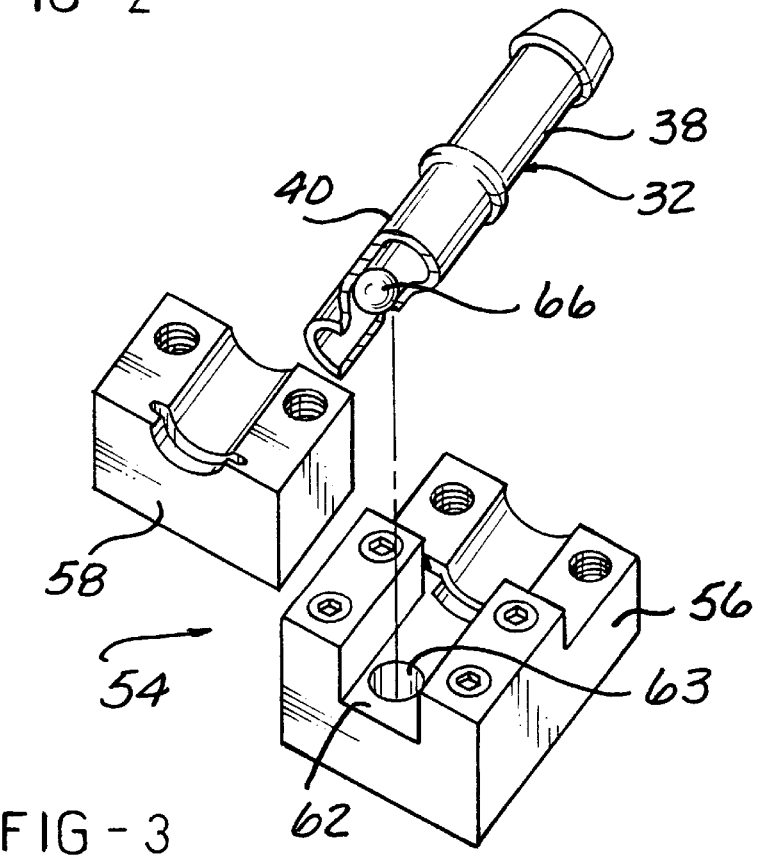
FIG. 3 is an exploded partial breakaway view showing the substantially cylindrical hollow tube, the sphere inside the tube, and the associated stamping dye.
Figure 4:
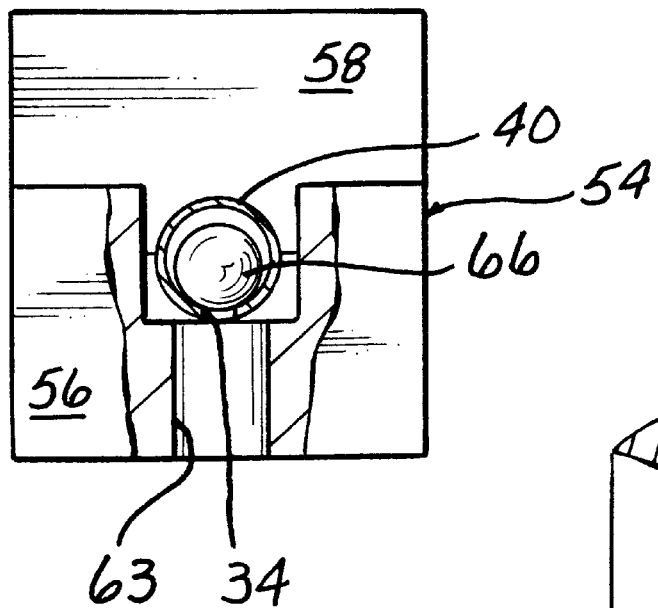
FIG. 4 shows a sectional view showing the tube and sphere inside the stamping press dye prior to compression.
Figure 5:
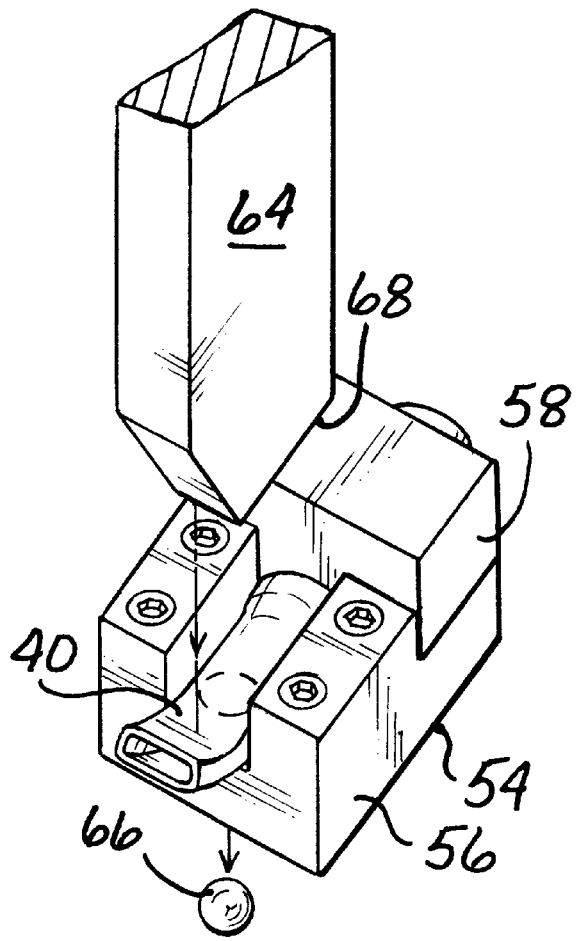
FIG. 5 is a perspective view showing the tube after its compressed on the stamping press wherein the sphere is extruded through the tube.

To create the desired configuration of the second portion 40 of the tubing 32, a stamping press dye 54 is utilized, as shown in FIG. 3–5. The stamping press dye 54 is preferably fabricated from a steel block wherein the final desired shape of the tubing 32 is formed in the stamping press dye 54. The stamping press dye 54 has a bottom half 56 and a top half 58 that are releasably fastened to secure and contain the tubing 32. The top half 58 and the bottom half 56 of the dye 54 have axially aligned threaded apertures 59 for receiving threaded fasteners (not shown) therein.

The stamping press dye 54 has a cylindrical configuration formed in the dye 54 for receiving the first portion 38 of the tubing 32. An annular ring 60 is also formed in the dye 54 for receiving the second bead 44 formed on the first portion 38 of the tubing 32. The stamping press dye 54 also has a rectangular portion 62 formed in the bottom half 56 of the dye 54 for receiving the second portion 40 of the tubing 32. An aperture 63 is formed in and extends through the bottom half 56 of the stamping press dye 54. The rectangular portion 62 of the dye 54 is open for receiving a ram or press 64 so that the ram 64 may engage the second portion 40 of the tubing Prior to the tubing 32 being placed in the stamping press dye 54, a solid steel sphere 66 is inserted within the second portion 40 of the tubing 32 and aligned with the aperture 62 provided in the second portion 40 of the tubing 32. In order that the sphere 66 may be inserted within the second portion 40 of the tubing 32, the sphere 66 has a diameter less than the inside diameter of the second portion 40 of the tubing 32. In addition, the sphere 66 has a diameter larger than the diameter of the aperture 34 so that the sphere 66 does not freely pass through the aperture 34.

To compress the second portion 40 of the tubing 32, the tubing 32 is placed into the bottom half 56 of the stamping press dye 54 with the sphere 66 properly aligned inside the second portion 40 of the tubing 32. The stamping press dye 54 is mounted or placed in a fixtured stamping press (not shown) wherein the ram 64 is driven downward in a controlled fashion against the second portion 40 of the tubing 32. The ram 64 provides a substantially rectangular flat surface 68 which engages and compresses the second portion 40 of the tubing 32 against the stamping press dye 54 to deform the second portion 40 of the tubing 32 into a substantially rectangular configuration, as seen in FIGS. 5–8.

In compressing the second portion 40 of the tubing 32, the ram 64 forces the sphere 66 through aperture 34 and extrudes the second portion 40 of the tubing 32 defining aperture 34. The extruded material of the second portion 40 forms a raised shoulder or lip 68 extending substantially outward from a substantially flat surface 70 formed on the second portion 40 of the tubing 32. After passing through aperture 34, the sphere 66 passes through aperture 63 provided in the bottom half 56 of the stamping press dye 54. The ram 64 is raised from the second portion 40 of the tubing 32, and the tubing 32 is removed from the stamping press dye 54.

Figure 6:
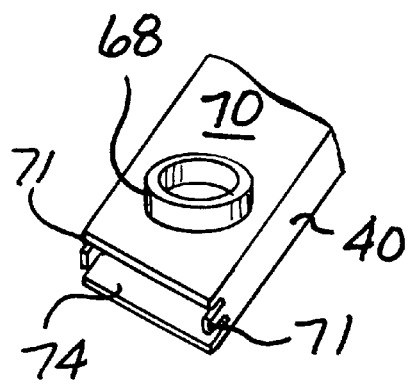
FIG. 6 is a perspective view of the open end of the second portion of the tube.
Figure 7:
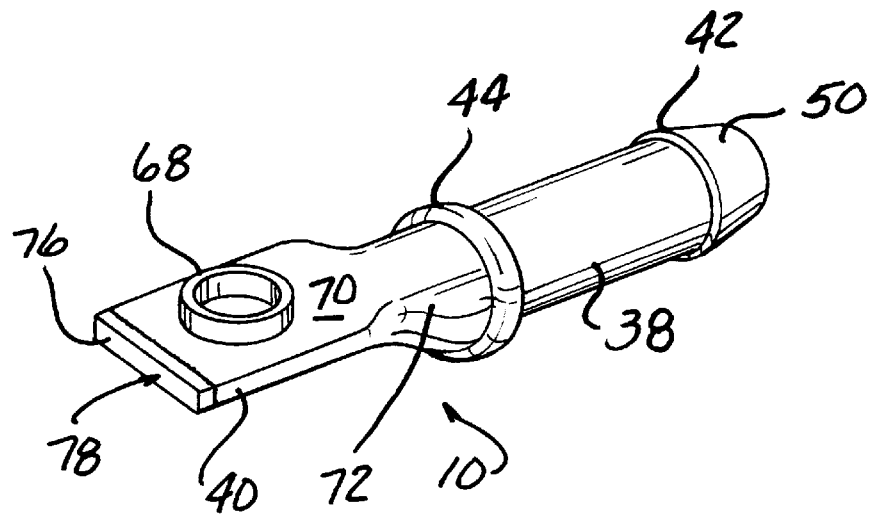
FIG. 7 is a perspective view showing the fluid coupling apparatus in a completed stage.

Due to the pressing operation performed on the second portion 40 of the tubing 32, a transition area 72 is formed wherein the substantially cylindrical configuration of the first portion 38 melds into the substantially rectangular configuration of the second portion 40. The second portion 40 extends to an open end 74 which, if too long, may be cut by conventional means to an appropriate length. The open end 74 of the second portion 40 of the tubing 32 is defined by walls 71 of the second portion 40. The walls 71 are notched at their ends, as shown in FIG. 6, and folded inwardly toward one another to form a partially closed end. A cap 76 is brazed onto the partially closed end of the second portion 40 of the tubing 32 to provide a sealed closed end 78 of the second portion 40.

To connect the fluid coupling apparatus 10 to the heat exchanger 14, the raised lip 68 of the second portion 40 of the tubing 32 is inserted into the aperture 20 provided in the side wall 22 of the heat exchanger 14. The raised lip 68 is rolled onto the interior of the side wall 22 of the heat exchanger 14, and the lip 68 is brazed to the interior of the side wall 22 to provide a rigid and sealed connection between the heat exchanger 14 and the fluid coupling apparatus 10. To connect the fluid hose 12 to the fluid coupling apparatus 10, the fluid hose 12 is pushed over the first bead 42 of the first portion 38 of the tubing 32 and slid along the first portion 38 of the tubing 32 until the fluid hose 12 abuts the second bead 44 on the first portion 38 of the tubing 32.

While the invention has been described in connection with what is presently considered to be the most practical and preferred embodiment, it is to be understood that the invention is not to be limited to the disclosed embodiment but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A method for manufacturing a fluid coupling apparatus for communicating fluid from a fluid hose to a heat exchanger, the steps comprising:

providing a substantially cylindrical hollow tube having a first portion and a second portion;

forming an aperture through a wall of said second portion of said tube;

placing a sphere inside said second portion of said tube and in axial alignment with said aperture; and compressing said second portion of said tube to form a substantially rectangular configuration and to force said sphere through said aperture and extrude a raised shoulder from an area of said second portion defining said aperture.

2. The method as stated in claim 1, further comprising:

forming a closed end in said second portion of said tube.

3. The method as stated in claim 1, further comprising:

forming a first bead on an open end of said first portion of said tube wherein said first bead provides a shoulder extending radially outward from said first portion of said tube; and forming a taper on said tube extending radially inward from said first bead toward an open end of said first portion.

4. The method as stated in claim 1, further comprising:

forming a second bead on said first portion of said tube wherein said second bead extends radially outward from said first portion of said tube and is positioned between said second portion and said first bead.

5. The method as stated in claim 1, further comprising:

rolling said shoulder to make said second portion connectable to said heat exchanger.

6. A method for manufacturing a fluid coupling apparatus for communicating fluid from a fluid hose to a heat exchanger, the steps comprising:

providing a substantially cylindrical metallic tube having a first portion and a second portion;

forming an aperture through a wall of said second portion;

placing a sphere inside said second portion of said tube and in axial alignment with said aperture wherein the diameter of said sphere is larger than the diameter of said aperture and smaller than the diameter of said second portion of said tube;

compressing said second portion of said tube to form a substantially rectangular configuration of said second portion and forcing said sphere through said aperture to extrude and form a shoulder extending outwardly from an area of said second portion defining said aperture; and forming a closed end in said second portion of said tube.

7. The method as stated in claim 6, further comprising:

forming a first bead on an open end of said first portion of said tube wherein said first bead provides a shoulder extending radially outward and tapering radially inward toward said open end of said first portion.

8. The method as stated in claim 6, further comprising:

forming a second bead on said first portion of said tube wherein said second bead extends radially outward from said tube and is axially spaced between said second portion and said first bead.

9. The method as stated in claim 6, further comprising:

rolling said shoulder to make said second portion connectable to said heat exchanger.

10. A method for manufacturing a fluid coupling apparatus for communicating fluid from a fluid hose to a heat exchanger, the steps comprising:

providing a substantially cylindrical hollow seamless welded tube having a first portion and a second portion;

punching an aperture through a single wall of said second portion;

inserting a sphere into said second portion of said tube wherein the diameter of said sphere is larger than the diameter of said aperture and smaller than the diameter of said second portion of said tube, and said sphere placed in axial alignment with said aperture;

placing said tube in a stamping press dye wherein said dye has a substantially rectangular portion formed therein for receiving said second portion of said tube, a substantially cylindrical portion formed therein for receiving said first portion of said tube, and a bore extending though said press dye for receiving said sphere;

compressing said second portion of said tube to extrude said sphere through said aperture and form a shoulder extending from said second portion for further defining said aperture and to form a substantially rectangular portion of said second portion of said tube;

cutting relief slots in an open end of said second portion of said tube to form integral tabs therewith;

folding said integral tabs to form a substantially closed end of said substantially rectangular second portion of said tube; and brazing a cap onto said integral tabs to form a closed end of said second portion of said tube.

11. The method as stated in claim 10, further comprising:

forming a first bead on an open end of said first portion of said tube wherein said first bead provides a shoulder extending radially outward; and forming a taper extending radially inward toward said open end of said first portion from said first bead.

12. The method as stated in claim 4, further comprising:

forming a second bead on said first portion of said tube wherein said second bead extends radially outward from said tube and is axially spaced between said second portion and said first bead.

13. The method as stated in claim 10, further comprising:

rolling said shoulder to make said second portion of said tube connectable to said heat exchanger.

* * * * *